July 28, 1959

W. H. LYON 2,897,287

LONG TIME CONTINUOUS MAGNETIC RECORDING WITH DELAYED MONITORING

Filed July 12, 1954

2 Sheets-Sheet 1

INVENTOR.
WILLIAM H. LYON
BY
H. G. Manning
ATTORNEY

INVENTOR.
WILLIAM H. LYON
BY
H. G. Manning
ATTORNEY 2,897,287

LONG TIME CONTINUOUS MAGNETIC RECORDING WITH DELAYED MONITORING

William H. Lyon, Orange, Conn., assignor to The Soundscriber Corporation, New Haven, Conn., a corporation of Connecticut Application July 12, 1954, Serial No. 442,800

1 Claim. (Cl. 179—100.2)

This invention relates to continuous long-time recorders wherein intelligence is recorded along parallel transverse lines on a wide magnetic tape, and is directed particularly to playback mechanism in combination with such a recorder for continuously monitoring the recorded intelligence at one or more substantial intervals of delay.

In applicant's previous patent application Serial No. 406,517, filed January 27, 1954, Patent No. 2,845,495, dated July 29, 1958 and entitled "Transverse Interrupted Track Magnetic Recorder with Transducer Head Drum on a Horizontal Axis," there was disclosed a long playing recording and reproducing apparatus wherein sound is recorded laterally along parallel transverse lines on a wide, slowly moving flexible strip of tape. In such an apparatus, 24 or more hours of intelligence can be recorded continuously on a single roll of tape. The present invention is an improvement over such an apparatus, and, in addition to recording a permanent record of all intelligence during the 24 hour period, means is also provided for simultaneously playing back the material at fixed delayed intervals for monitoring purposes.

The invention finds application, for example, in recording communications, wherein there may be long periods of inactivity interrupted by periods of transmission activity of interest to operating personnel. By means of the apparatus comprising this invention, if a monitoring operator on a communications circuit hears an incoming message of particular importance, he will have time to alert all interested parties, and they in turn may listen in on a reproduction picked up by a first reproducing head drum delayed 30 seconds, for example, from the instant of recording. If they should miss part of the recording, it will be possible for them to listen in again on a second reproduction from a second reproducing head drum providing a longer delay, such as one or two minutes from the time of recording, for example. Such delayed monitoring, moreover, is achieved without interruption of the continuous recording of the apparatus.

It is accordingly the principal object of the present invention to provide, in a recorder of the character described, one or more reproducing mechanisms for listening in on intelligence being continuously recorded, at short periods of time after the instant of recording, without disrupting the continuous recording process.

A further object is to provide an apparatus of the above nature which will be simple in construction, inexpensive to manufacture, easy to install and manipulate, ornamental in appearance, and very efficient and durable in use.

With these and other objects in view, there has been illustrated on the accompanying drawings one form in which the invention may conveniently be embodied in practice.

Figure 1:
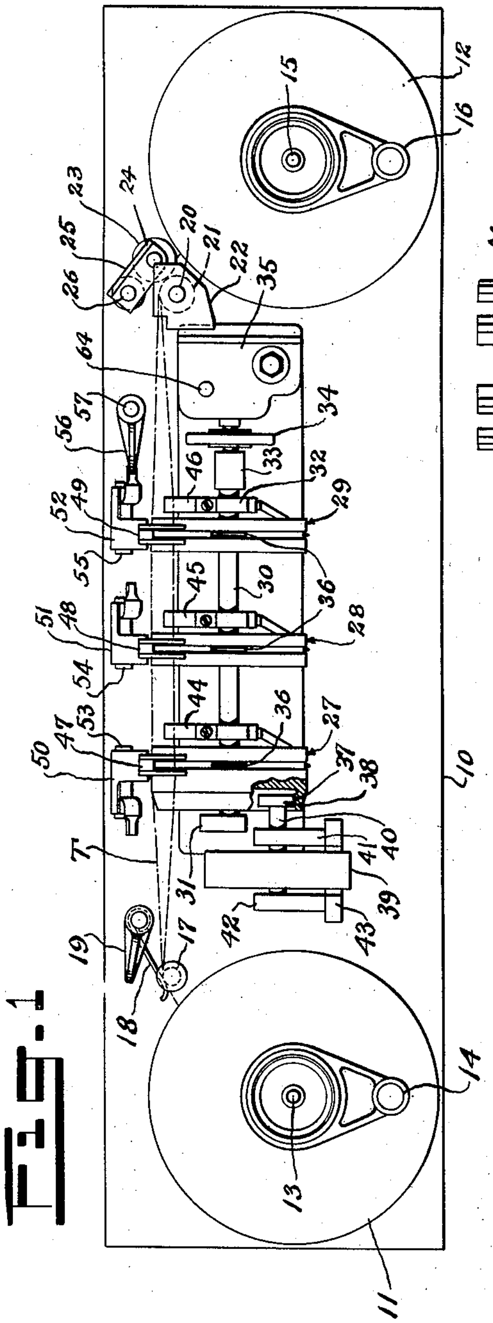
Fig. 1 is a front elevational view of a recorder embodying the invention.
Figure 2:
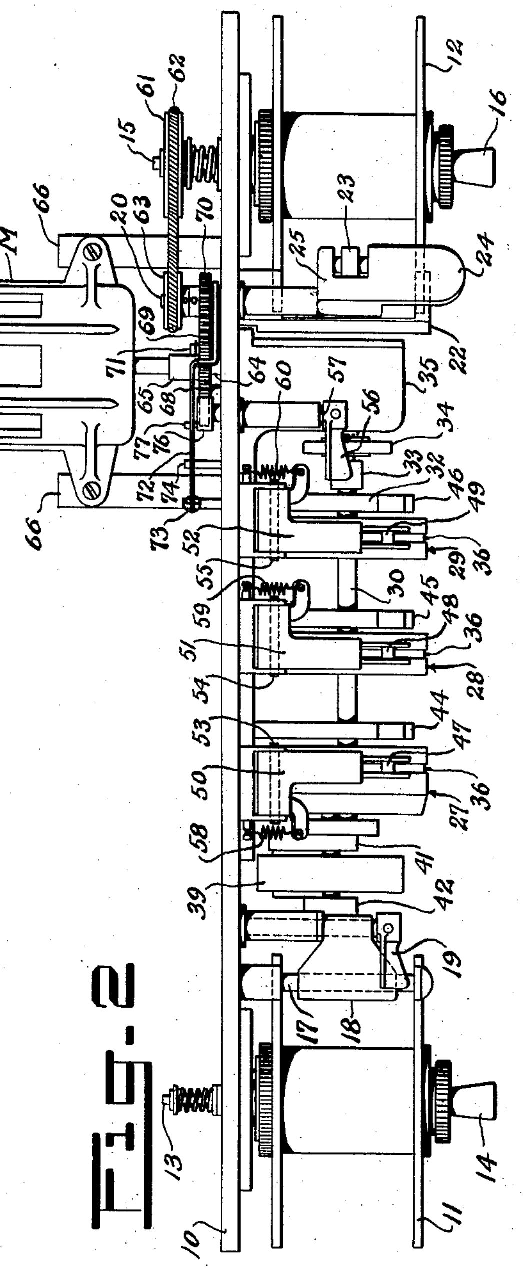
Fig. 2 is a top plan view of the same.

Referring now to the drawings, in which like reference numerals denote corresponding parts throughout the several views, the numeral 10 denotes a vertical chassis plate or motor board on which the recorder mechanism is supported. The recorder mechanism comprises a feed reel 11 rotatably mounted on a shaft 13 at the left hand side of the chassis plate—said reel 11 being capable of holding enough wide recording tape T for 24 hours or more of recording. The feed reel 11 is held in place by means of a manually operable feed reel crank 14, which also may be used for running the tape T backwards in playback or for rewinding said tape. A take-up reel 12, similar to the feed reel 11, is rotatably mounted on a shaft 15 at the right hand side of the chassis plate 10 and is secured thereon by means of a take-up reel crank 16 similar to the crank 14. The take-up crank 16 may be used for winding the tape forward whenever necessary.

As the tape T leaves the feed reel 11, it passes over a tape guide spindle 17 against which it is pressed by a tension shoe 18. The shoe 18 provides the necessary tension in the tape as it moves over a recording head drum 27, and reproducing head drums 28 and 29, and said shoe 18 may be withdrawn for insertion or removal of the recording tape T by means of a tension shoe handle 19.

The tape T next passes through the recording and playback mechanism, to be later described, and thence over a feed roller 21 securely mounted on a shaft 20 journalled in a stanchion 22 fixed to the chassis plate 10. The feed roller shaft 20 passes through an opening in the chassis plate 10 for connection with a drive motor M, described later.

The tape T is held firmly against the feed roller 21 for frictional drive thereby, by means of a spring-biased feed pressure roller 23 journalled on a support arm 25 pivoted on a shaft 26. The pressure roller support arm 25 is provided with a handle 24 which is used for raising the pressure roller 23 from the tape for reloading or scanning.

As the tape T leaves the tape guide spindle 17 it curves around the peripheral surface of the recording head drum 27, and then passes over the reproducing head drum 28 and the reproducing head drum 29 in succession. The three head drums 27, 28 and 29 are mounted on a common longitudinal shaft 30, for simultaneous rotation powered by the output shaft of a gear box 35. The shaft 30 is supported at each end by bearings 31 and 32. The right hand end of the shaft 30 is provided with a shaft adaptor 33 attached to a flexible drive coupling member 34 connected with the output shaft of the gear box 35.

Each of the three head drums 27, 28 and 29 is provided with a plurality of record-reproduce transducer heads 36. The operation and circuitry of these transducer heads 36 is well known in the art and is therefore not further described herein.

The recording head drum 27 has an inner circular raceway 37 adapted for firm frictional engagement with a rubber stabilizing wheel 38 mounted on the end of a shaft 40 carrying a flywheel 39, thereby smoothing out disturbances originating in the gear box 35. The flywheel shaft 40 is journalled in bearings 41 and 42 supported by a bracket 43 affixed to the chassis 10.

Tape guide brackets 44, 45 and 46 adjacent each of the head drums 27, 28, and 29 serve to hold the tape in a straight line and prevent it from creeping around in the direction of rotation of the head drums.

The tape T is held in close contact with the transducer head pole tips 36 by respective tape pressure shoes 47, 48 and 49, said shoes being held in position by respective arms 50, 51, and 52 pivoted on the chassis 10 by means of pins 53, 54, and 55. The shoes 47, 48, and 49 are resiliently held with uniform pressure against the tape T by toggle springs 58, 59 and 60, respectively, and can be lifted up from the head drums for tape reloading when they will remain in their raised position by reason of the toggle action of said springs.

When a recorded tape T is inserted in the machine for the purpose of playback only, it will be necessary at times to shift the tape longitudinally with respect to the reproducing head drums 28 and 29 so that the recorded tracks will align with the scanning paths of the transducer heads 36. This may be accomplished by swinging a lever 56 fixed to one end of a shaft 57, rotatably journalled in the chassis plate 10. The other end of the shaft 57, which extends through the chassis plate 10, is provided with a collar 76 having an outwardly extending eccentric pin 77 cooperative with tape drive mechanism as described later.

Figure 3:
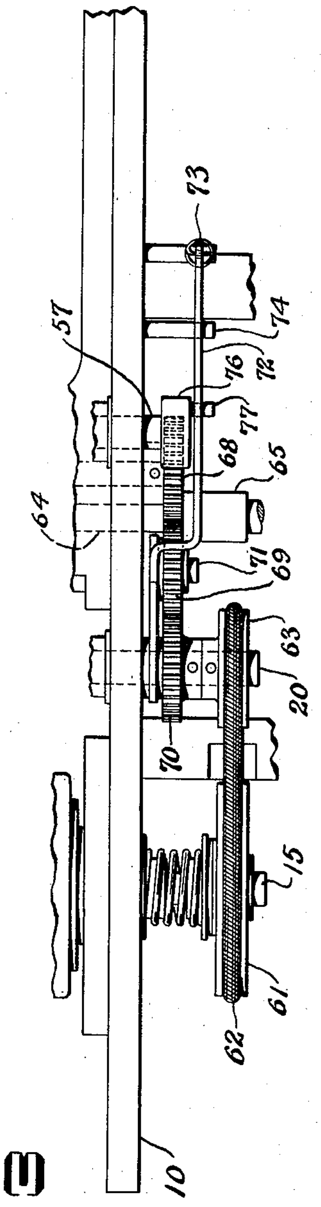
Fig. 3 is a fragmentary top plan view, on an enlarged scale, of the cooperative tape drive and tuning mechanism of the recorder shown in Figs. 1 and 2.
Figure 4:
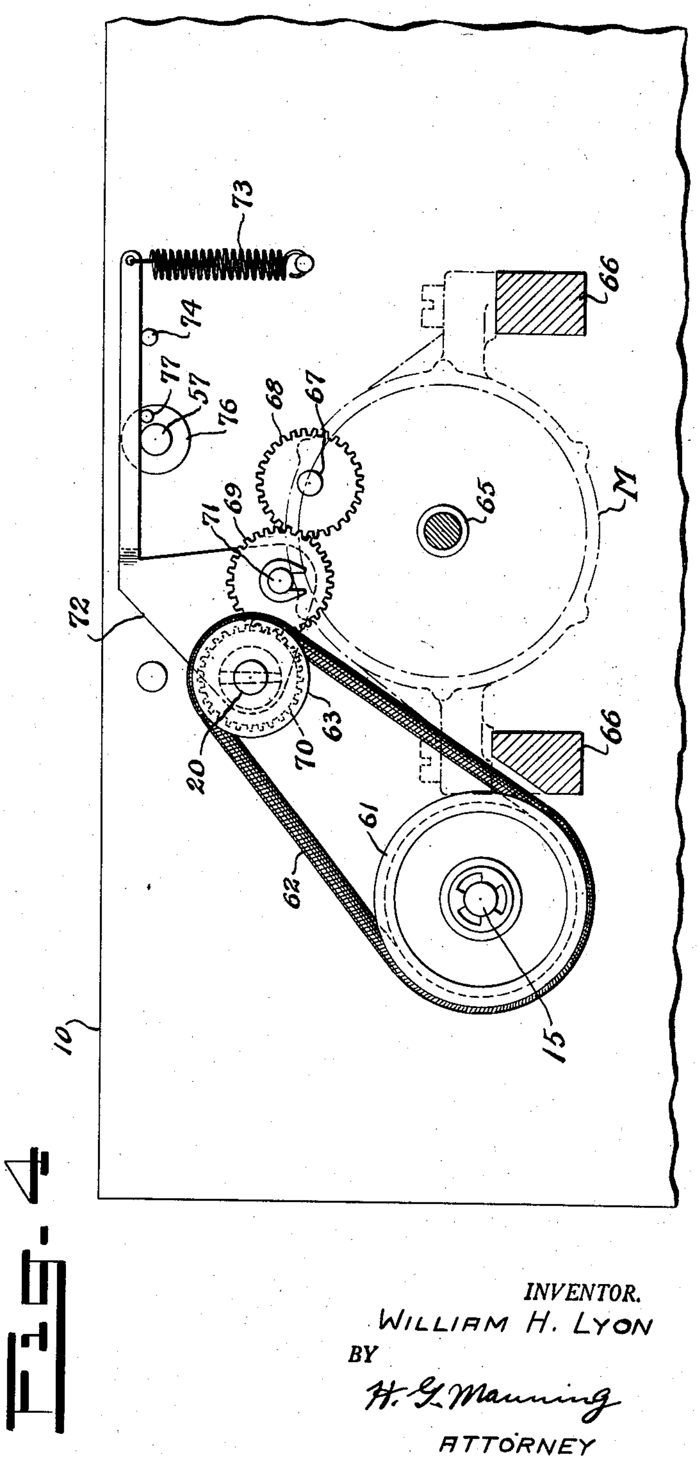
Fig. 4 is an elevational view of the mechanism shown in Fig. 3.

The tape drive mechanism (Figs. 3, 4) is motivated by the motor M mounted on brackets 66 extending from the back of chassis plate 10. The output shaft of the motor M is fitted with a coupling 65 which is attached to the input shaft 64 of the gear box 35. The gear box 35 is fitted with a slow speed output shaft 67 extending through the back of the chassis plate 10 and drives the tape feed mechanism. A tape feed gear 68 is fitted on the shaft 67 and drives an idler gear 69 which in turn drives a feed roller gear 70 fixed to the end of the feed roller shaft 20 of the chassis 10.

The idler gear 69 is mounted on a spindle 71, the rear of which projects from an idler gear support plate 72, pivoted on the shaft 20 and causes the idler gear to move slightly up and down during the tuning operation in order to change the angular position of the feed roller 21 with respect to the transducer heads 36. A coil spring 73 holds the support plate 72 against a stop pin 74 or against the tuning lever pin 77.

Means is provided to drive the take-up reel 12, comprising a pulley 61 fixed to the end of the take-up reel shaft 15 behind the chassis 10, a drive pulley 63 fixed to one end of the feed roller shaft 20, and a belt 62 interconnecting said pulleys. The belt 62 is preferably a coil spring so that it will readily slip on the pulleys without overdriving the tape T.

The principal advantage of the present invention is that a communications circuit being continuously recorded can be monitored from the recorder at delayed intervals without interrupting the recording process.

While there has been disclosed in this specification one form in which the invention may be embodied in practice, it is to be understood that this form is shown for the purpose of illustration only, and is not to be limited to the specific disclosure, but may be modified and embodied in various other equivalent forms without departing from its spirit. In short, the invention includes all the modifications and embodiments coming within the scope of the following claim:

Having thus fully described the invention, what is claimed as new and for which it is desired to secure Letters Patent is:

In a long playing continuous sound recording and reproducing apparatus, wherein intelligence may be permanently recorded in parallel, equally spaced successive transverse tracks on a continuously wide moving magnetic tape, mechanism for moving said tape at a uniform speed longitudinally in a substantially straight path, a rotating shaft parallel to said path, a recording drum carried on said shaft for rotation therewith, and having equally spaced sound transducer heads mounted therein, a plurality of pickup drums also mounted on said shaft and having equally spaced sound transducer heads, said pickup drums being spaced from said recording drum by distances equal to a multiple of the distance between said successive recorded tracks, whereby said intelligence may be continuously monitored at a plurality of delayed intervals of time sufficient to permit interested parties to be alerted and permitted to listen in to the intelligence recorded on said tape, said tape also forming a permanent record of the sound recorded thereon, for future transcription whenever desired.

References Cited in the file of this patent

UNITED STATES PATENTS

| | | |
|---|---|---|
| 2,105,318 | Goldsmith | Jan. 11, 1938 |
| 2,245,286 | Marzocchi | June 10, 1941 |
| 2,326,332 | Clausen | Aug. 10, 1943 |
| 2,561,698 | Hogan | July 24, 1951 |